United States Patent
Zhou et al.

(10) Patent No.: US 10,367,613 B2
(45) Date of Patent: Jul. 30, 2019

(54) USER EQUIPMENT, CONTROL METHOD THEREOF AND NETWORK SIDE DEVICE

(71) Applicant: SPREADTRUM COMMUNICATIONS (SHANGHAI) CO., LTD., Zhangjiang, Shanghai (CN)

(72) Inventors: Huayu Zhou, Shanghai (CN); Hualei Wang, Shanghai (CN); Weijie Xu, Shanghai (CN); Yang Liu, Shanghai (CN); Yanan Jia, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 59 days.

(21) Appl. No.: 15/453,141

(22) Filed: Mar. 8, 2017

(65) Prior Publication Data
US 2017/0324524 A1   Nov. 9, 2017

(30) Foreign Application Priority Data
May 9, 2016   (CN) .......................... 2016 1 0302106

(51) Int. Cl.
*H04L 5/00* (2006.01)
*H04W 72/04* (2009.01)
*H04W 72/12* (2009.01)

(52) U.S. Cl.
CPC .......... *H04L 5/0007* (2013.01); *H04L 5/0094* (2013.01); *H04W 72/044* (2013.01); *H04W 72/1263* (2013.01); *H04L 5/0053* (2013.01); *H04W 72/042* (2013.01)

(58) Field of Classification Search
None
See application file for complete search history.

(56) References Cited

U.S. PATENT DOCUMENTS

2008/0287137 A1   11/2008   Li et al.
2018/0076924 A1*   3/2018   Lee ........................ H04L 1/0026

FOREIGN PATENT DOCUMENTS

| CN | 1750703 A | 3/2006 |
|---|---|---|
| CN | 103906243 A | 7/2014 |
| CN | 104348600 A | 2/2015 |

OTHER PUBLICATIONS

Guoliang Sun, "Research on 4G LTE cell search process and algorithm," Information & Communications; the No. 5 (sum. No. 121), Oct. 15, 2012, pp. 61-62.
SIPO First Office Action for corresponding CN Application No. 201610302106.6; dated May 2, 2018.

* cited by examiner

*Primary Examiner* — Diane L Lo
(74) *Attorney, Agent, or Firm* — Cantor Colburn LLP

(57) ABSTRACT

A user equipment, a control method thereof and a network side device are provided in the present disclosure. The control method includes: indicating configuration information of a subband to be configured to a user equipment via a common control channel of a basic subband, such that the user equipment can use the subband to be configured according to the configuration information, wherein the basic subband is a subband to which the user equipment has access, and the subband to be configured comprises any subband within a bandwidth resource. The above method can support the flexibility of subband configuration.

28 Claims, 3 Drawing Sheets

USER EQUIPMENT, CONTROL METHOD THEREOF AND NETWORK SIDE DEVICE

CROSS-REFERENCE TO RELATED APPLICATIONS

This application claims the benefit of priority to Chinese Patent Application No. 201610302106.6, titled "USER EQUIPMENT, CONTROL METHOD THEREOF AND NETWORK SIDE DEVICE", filed on May 9, 2016, the entire disclosure of which are incorporated herein by reference.

TECHNICAL FIELD

The present disclosure relates to communication technology field, and more particularly, to a user equipment, a network side device, and a control method of the user equipment.

BACKGROUND

The Fifth Generation (5G) mobile communication technology is a main development trend of a new generation mobile communication technology, and is an important part of a new generation of information infrastructure in the future. Compared with 4G, 5G will not only further improve the user's network experience, but also meet the future application requirements of Internet of Everything (IoE). From the user's experience, 5G has a higher speed and a wider bandwidth. 5G is expected to be about 10 times faster than 4G, and it will just take a few seconds to download a high-definition movie, and is capable of meeting demand of consumers for virtual reality, super high-definition video or other higher network experience requirements. From industry application perspective, 5G has a higher reliability, and a lower latency, which can meet the specific needs of industry application such as intelligent manufacturing and automatic driving etc., broaden development space of convergence industry and support innovation and development of economic society.

5G system divides the whole continuous bandwidth resources into different subbands, in order to meet the requirements of different application scenarios and deployment scenarios, the different subbands may correspond to different configurations. Therefore, there is a need for a solution to instruct the user equipment to perform configuration based on the subbands becomes an urgent problem to be solved.

SUMMARY

The technical problem solved by the present disclosure is to instruct the user equipment to perform configuration based on subbands to support the flexibility of subband configuration.

In order to resolve the above technical problem, a control method of a user equipment is provided, including: indicating configuration information of a subband to be configured to the user equipment via a common control channel of a basic subband, such that the user equipment can use the subband to be configured according to the configuration information, wherein the basic subband is a subband to which the user equipment has access, and the subband to be configured includes any subband within a bandwidth resource.

In some embodiments, indicating the configuration information of the subband to be configured to the user equipment includes: transmitting the configuration information of the subband to be configured directly through the common control channel.

In some embodiments, indicating the configuration information of the subband to be configured to the user equipment includes: instructing the user equipment to decode a high-layer signaling via the common control channel to obtain the configuration information of the subband to be configured.

In some embodiments, the configuration information of the subband to be configured includes at least one of: carrier configuration information of the subband to be configured, signal waveform configuration information of the subband to be configured, and configuration information of a user-specified control channel, wherein the user-specified control channel is a control channel assigned to the user equipment by a network side.

In some embodiments, the configuration information of the user-specified control channel includes at least one of: time-frequency resource location configuration information of the user-specified control channel, and reference signal configuration information of the user-specified control channel.

In some embodiments, the configuration information of the subband to be configured includes configuration information of a user-specified control channel, and the user equipment detects control information on the user-specified control channel based on the configuration information of the user-specified control channel.

In some embodiments, the control method further includes: instructing the user equipment to transmit and receive data through the control information on the user-specified control channel.

In some embodiments, the data is transmitted and received via a subband where the user-specified control channel is located.

In some embodiments, the data is transmitted and received via a subband other than a location subband where the user-specified control channel is located.

In some embodiments, the configuration information includes repeating instruction information for instructing the user equipment to perform configuration periodically in accordance with the configuration information.

In some embodiments, the user equipment uses the basic subband by way of receiving a broadcast type signal and channel from a dedicated resource unit of a network side located within the basic subband for accessing the basic subband; wherein, the dedicated resource unit is only applied to transmit the broadcast type signal and channel, and the dedicated resource unit is continuous in a frequency domain and a time domain.

In some embodiments, after indicating the configuration information of the subband to be configured to the user equipment via the common control channel of the basic subband, the control method further includes: indicating configuration information of a unicast configured subband to the user equipment in a unicast mode via the subband to be configured.

A control method of a user equipment is provided according to another embodiment of the present disclosure, including:

receiving an indication from a network side via a common control channel of a basic subband, wherein the indication is about configuration information of a subband to be configured; and performing configuration according to the indication about the configuration information of the subband to be configured, to use the subband to be configured;

wherein the basic subband is a subband to which the user equipment has access, and the subband to be configured includes any subband within a bandwidth resource.

In some embodiments, performing configuration may include performing configuration to internal parameters of the user equipment.

In some embodiments, the indication about the configuration information of the subband to be configured directly includes the configuration information of the subband to be configured.

In some embodiments, the indication about the configuration information of the subband to be configured includes: scheduling information instructing the user equipment to decode a high-layer signaling; and the user equipment decodes the high-layer signaling according to the scheduling information to obtain the configuration information of the subband to be configured.

In some embodiments, the configuration information of the subband to be configured includes at least one of: carrier configuration information of the subband to be configured, signal waveform configuration information of the subband to be configured, and configuration information of a user-specified control channel, wherein the user-specified control channel is a control channel assigned to the user equipment by the network side.

In some embodiments, the configuration information of the user-specified control channel includes at least one of: time-frequency resource location configuration information of the user-specified control channel, and reference signal configuration information of the user-specified control channel.

In some embodiments, the configuration information of the subband to be configured includes configuration information of a user-specified control channel, and the control method further includes: detecting control information on the user-specified control channel based on the configuration information of the user-specified control channel.

In some embodiments, transmitting and receiving data according to the control information on the user-specified control channel.

In some embodiments, the data is transmitted and received via a subband where the user-specified control channel is located.

In some embodiments, the data is transmitted and received via a subband other than a location subband where the user-specified control channel is located.

In some embodiments, the configuration information includes repeating instruction information for instructing the user equipment to perform configuration periodically in accordance with the configuration information.

In some embodiments, the control method further includes:

receiving a broadcast type signal and channel from a dedicated resource unit of the network side located within the basic subband; and accessing the basic subband through the broadcast type signal and channel;

wherein the dedicated resource unit is only applied to transmit the broadcast type signal and channel, and the dedicated resource unit is continuous in a frequency domain and a time domain.

In some embodiments, following performing configuration according to the indication about the configuration information of the subband to be configured, the control method further includes: receiving a unicast indication about a unicast configured subband from the network side via the subband to be configured, wherein the unicast configured subband is a subband other than the subband to be configured.

A network side device is also provided according to an embodiment of the present disclosure, including: an indication circuitry, configured to indicate configuration information of a subband to be configured to the user equipment via a common control channel of a basic subband, such that the user equipment can use the subband to be configured according to the configuration information, wherein the basic subband is a subband to which the user equipment has access, and the subband to be configured includes any subband within a bandwidth resource.

In some embodiments, the indication circuitry is configured to transmit the configuration information of the subband to be configured directly through the common control channel.

In some embodiments, the indication circuitry is configured to instruct the user equipment to decode a high-layer signaling via the common control channel to obtain the configuration information of the subband to be configured.

In some embodiments, the configuration information of the subband to be configured includes at least one of: carrier configuration information of the subband to be configured, signal waveform configuration information of the subband to be configured, and configuration information of a user-specified control channel, wherein the user-specified control channel is a control channel assigned to the user equipment by a network side.

In some embodiments, the configuration information of the user-specified control channel includes at least one of: time-frequency resource location configuration information of the user-specified control channel, and reference signal configuration information of the user-specified control channel.

In some embodiments, the configuration information of the subband to be configured includes configuration information of a user-specified control channel, and the user equipment detects control information on the user-specified control channel based on the configuration information of the user-specified control channel.

In some embodiments, the network side device further includes a data transceiving control circuitry, configured to instruct the user equipment to transmit and receive data through the control information on the user-specified control channel.

In some embodiments, the data is transmitted and received via a subband where the user-specified control channel is located.

In some embodiments, the data is transmitted and received via a subband other than a location subband where the user-specified control channel is located.

In some embodiments, the configuration information includes repeating instruction information for instructing the user equipment to perform configuration periodically in accordance with the configuration information.

In some embodiments, the user equipment accesses the basic subband in the following ways: receiving a broadcast type signal and channel from a dedicated resource unit of the network side located within the basic subband for accessing the basic subband; wherein the dedicated resource unit is only applied to transmit the broadcast type signal and channel, and the dedicated resource unit is continuous in a frequency domain and a time domain.

In some embodiments, the network side device further includes: a unicast indication circuitry, configured to indicate configuration information of a unicast configured subband to the user equipment in a unicast mode via the subband to be configured, wherein the unicast configured subband is a subband other than the subband to be configured.

A user equipment is also provided according to an embodiment of the present disclosure, including:

an indication receiving circuitry, configured to receive an indication from a network side via a common control channel of a basic subband, wherein the indication is about configuration information of a subband to be configured; and a configuration circuitry for the subband to be configured, configured to perform configuration according to the indication about the configuration information of the subband to be configured, to use the subband to be configured;

wherein the basic subband is a subband to which the user equipment has access, and the subband to be configured includes any subband within a bandwidth resource.

In some embodiments, the configuration circuitry may perform configuration to internal parameters of the user equipment.

In some embodiments, the indication about the configuration information of the subband to be configured directly includes the configuration information of the subband to be configured.

In some embodiments, the indication about the configuration information of the subband to be configured includes: scheduling information instructing the user equipment to decode a high-layer signaling; and the user equipment further includes a high-layer signaling decoding circuitry, configured to decode the high-layer signaling according to the scheduling information to obtain the configuration information of the subband to be configured.

In some embodiments, the configuration information of the subband to be configured includes at least one of: carrier configuration information of the subband to be configured, signal waveform configuration information of the subband to be configured, and configuration information of a user-specified control channel, wherein the user-specified control channel is a control channel assigned to the user equipment by the network side.

In some embodiments, the configuration information of the user-specified control channel includes at least one of: time-frequency resource location configuration information of the user-specified control channel, and reference signal configuration information of the user-specified control channel.

In some embodiments, the configuration information of the subband to be configured includes configuration information of a user-specified control channel, and the user equipment further includes a control information detecting circuitry, configured to detect control information on the user-specified control channel based on the configuration information of the user-specified control channel.

In some embodiments, the user equipment further includes a data transceiving circuitry, configured to transmit and receive data according to the control information on the user-specified control channel.

In some embodiments, the data transceiving circuitry is configured to transmit and receive the data via a subband where the user-specified control channel is located.

In some embodiments, the data transceiving circuitry is configured to transmit and receive the data via a subband other than a location subband where the user-specified control channel is located.

In some embodiments, the configuration information includes repeating instruction information for instructing the user equipment to perform configuration periodically in accordance with the configuration information.

In some embodiments, the user equipment further includes:

a broadcast type signal and channel receiving circuitry, configured to receive a broadcast type signal and channel from a dedicated resource unit of the network side located within the basic subband; and a basic subband accessing circuitry, configured to access the basic subband through the broadcast type signal and channel;

wherein the dedicated resource unit is only applied to transmit the broadcast type signal and channel, and the dedicated resource unit is continuous in a frequency domain and a time domain.

In some embodiments, the user equipment further includes a unicast indication receiving circuitry, configured to receive a unicast indication for a unicast configured subband from the network side via the subband to be configured, wherein the unicast configured subband is a subband other than the subband to be configured.

Compared with the conventional technology, the present disclosure has the following advantages:

Flexible subband configuration makes communication system configure resources more flexibly. However if the user equipment can not acquire the configuration of different subbands, it can not detect the scheduling information of the network side either, and thus can not use the different subbands for business process; according to the embodiments of the present disclosure, configuration information of a subband to be configured is indicated to a user equipment via a common control channel of a basic subband, so that the user equipment can perform configuration based on the subband to be configured according to the indication of the common control channel, and then the user equipment can detect the scheduling information, and be scheduled for transmitting and receiving data, thus any subband within the system bandwidth can be used. By the above process, the user equipment can use the subbands with different configuration, to realize flexible configuration of the subbands within the system bandwidth, moreover business process can be carried out in the subbands with flexible configuration to meet the requirements of different application scenarios.

Further, the configuration information of the subband to be configured can be transmitted directly through the common control channel since the common control channel is a physical channel at the bottom of 5G system, it can more efficiently instruct the user equipment to perform configuration based on the subband to be configured by transmitting the configuration information directly through the bottom layer, and then the configuration efficiency of the user equipment based on the subband to be configured can be improved, as well as the user equipment's usage of the subband to be configured.

Further, the user equipment is instructed to decode a high-layer signaling over the common control channel, after receiving the instruction from the network side, the user equipment decodes the high-layer signaling to obtain the configuration information of the subband to be configured; obtaining the configuration information of the subband to be configured through the high-layer signaling, the user equipment only needs to receive the instruction of decoding the high-layer signaling, and after decoding the high-layer signaling, the user equipment obtains the configuration information of the subband to be configured through the data channel, which does not occupy the resources of the common control channel; since the instruction of decoding the high-layer signaling occupies less resources of the common control channel, the user equipment can obtain a relatively complete configuration information of the subband to be configured under the premise of saving the common control channel resources; in addition, during instructing the user equipment to decode the high-layer signaling to obtain the configuration information, the network side may receive feedback from the user equipment, therefore the reliability of instructing the user equipment to perform configuration can be enhanced.

Further, the broadcast type signal and channel is transmitted to the user equipment through the dedicated resource unit in the subband, so that the user equipment can perform configuration and blind detection according to the broadcast type signal and channel to access the network; since the dedicated resource unit is continuous in a time domain and a frequency domain, the dedicated resource unit is only applied to transmit the broadcast type signal and channel, and the broadcast type signal and channel included in each dedicated resource unit can support the user equipment to access the network independently, thus the dedicated resource unit, as a minimum resource unit capable of supporting the user equipment to access the network, occupies a narrower frequency band. Therefore the control method according to the embodiments of the present disclosure can also be applied to a variety of user equipments with different bandwidth requirements or restrictions.

Further, the configuration information of the unicast configured subband is indicated to the user equipment in the unicast mode via the subband to be configured, the network side may allocate different subbands to different user equipments according to the situation, whereby it is possible for the user equipment to perform a targeted detection, namely only to detect user-specified control channels of the allocated subbands, which can reduce the complexity of detecting the channels of the user equipment.

DETAILED DESCRIPTION

As mentioned above, 5G system divides the whole continuous bandwidth resources into different subbands. In order to meet the requirements of different scenarios and deployment scenarios, the different subbands may correspond to different configurations. Thus, how to instruct the user equipment to perform configuration based on the subbands become an urgent problem to be solved.

Flexible subband configuration can make communication system configure resources more flexibly. However if the user equipment can not acquire the configuration of different subbands, it can also not detect the scheduling information of the network side, and thus can not use the different subbands for business process; according to the embodiments of the present disclosure, configuration information of a subband to be configured is indicated to a user equipment via a common control channel of a basic subband, so that the user equipment can perform configuration based on the subband to be configured according to the indication of the common control channel, and then the user equipment can detect the scheduling information, and be scheduled for transmitting and receiving data, thus any subband within the system bandwidth can be used. By the above process, the user equipment can use the subbands with different configuration, to realize flexible configuration of the subbands within the system bandwidth, moreover business process can be carried out in the subbands with flexible configuration to meet the requirements of different application scenarios.

In order that the above objects, features and advantages of the present invention will become more apparent, specific embodiments of the present invention will be described in detail with reference to the accompanying drawings.

Figure 1:
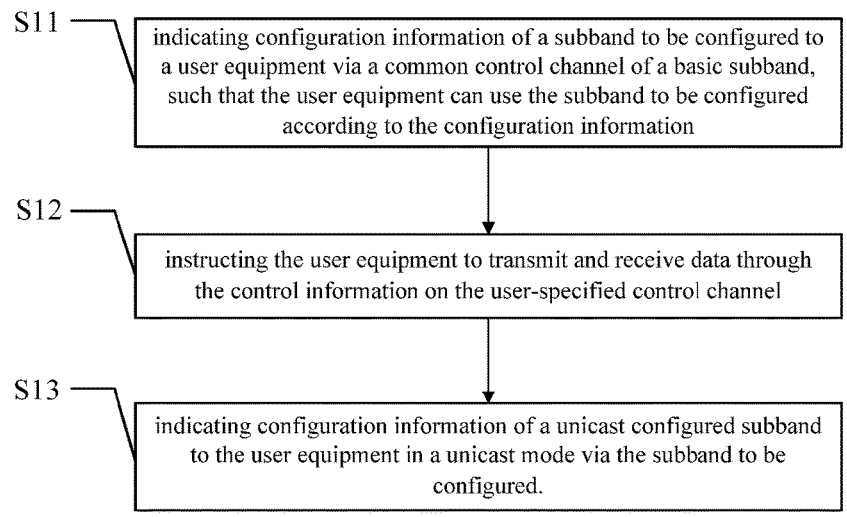
FIG. 1 schematically illustrates a flow chart of a control method of a user equipment according to an embodiment of the present disclosure.

FIG. 1 schematically illustrates a flow chart of a control method of a user equipment according to an embodiment of the present disclosure.

The control method of the user equipment shown in FIG. 1 may be a control method implemented by a network side to control a user equipment.

In step S11, configuration information of a subband to be configured is indicated to the user equipment via a common control channel of a basic subband, so that the user equipment can use the subband to be configured according to the configuration information, wherein the basic subband is a subband to which the user equipment has access.

Wherein, the access means that the user equipment can obtain a broadcast type signal and channel from the network side, then the user equipment can receive the configuration information from the network side, which makes a basic preparation for being scheduled by the network side; and the use means the user equipment has been configured to be capable of detecting scheduling (control) information, and being scheduled to transmit and receive data for business process. In some embodiments, the access may be an initial access.

The user equipment may not obtain configuration information of a control channel for scheduling information in the basic subband after the access, therefore, there is also a possibility that the scheduling information can not be received through the basic subband; therefore, according to the embodiments of the present disclosure, the configuration information may be configuration information of the basic subband or configuration information of a subband other than the basic subband. When the configuration information of the control channel for scheduling information on the basic subband is predefined, then the configuration information may not include the configuration information of the basic subband.

It is understood that, when the configuration information is the configuration information of a subband other than the basic subband, the configuration information may include information enabling the user equipment to access the subband to be configured, and also include information enabling the user equipment to accept system side scheduling and carry out business process; when the configuration information is configuration information of the basic subband, since the user equipment has access to the basic subband, the configuration information may only include information that enables the user equipment to be scheduled by the system side in the basic subband and carry out the business process.

In some embodiments, the basic subband may be a subband that the user equipment has access to, the subband to be configured includes any subband within a bandwidth resource, and the common control channel may be applied to broadcast to the user equipment, and schedule the user equipment to decode to obtain information such as system information, paging information and random access feedback information.

In some embodiments of the present disclosure, the basic subband may be any of different subbands into which all the bandwidths are divided, and may be determined by the network side. The process by which the user equipment accesses the basic subband may include receiving a broadcast type signal and channel from a dedicated resource unit of the network side located within the basic subband to access the basic subband.

Wherein the dedicated resource unit may be a predefined resource block continuous in a time domain and a frequency domain, and may include a subframe or a Transmission Time Interval (TTI). The dedicated resource unit is only applied to transmit the broadcast type signal and channel such as a synchronization signal, a broadcast channel, a control channel, and so on. The dedicated resource unit is not mixed with resource block of transmitting business data, so the dedicated resource unit occupies less bandwidth, and can be applied to user equipments with variety of bandwidth. After receiving a dedicated resource unit, the user equipment can access the basic subband according to signals and channels included in the dedicated resource unit.

In some embodiments, a dedicated resource unit is encoded and modulated independently, accordingly the user equipment can independently decode and demodulate a dedicated resource unit.

In some embodiments of the present disclosure, the common control channel is independently coded and modulated, and the user equipment can also independently demodulate and decode a common control channel.

In some embodiments, indicating configuration information of the subband to be configured to a user equipment, is to make the user equipment obtain the configuration information of the subband to be configured directly or indirectly according to the indication, so that the user equipment can perform configuration according to the configuration information of the subband to be configured, so that the user equipment can use the subband to be configured.

In a non-limiting embodiment, configuration information of a subband to be configured may be indicated to a user equipment by directly transmitting the configuration information of the subband to be configured through a common control channel. Then, the user equipment obtains the configuration information of the subband to be configured directly through the common control channel of the basic subband, that is, obtains the configuration information of the subband to be configured dynamically.

The common control channel is a bottom layer of the 5G system and a physical channel. By transmitting the configuration information directly through the bottom layer, it is possible to efficiently instruct the user equipment to perform configuration based on the subband to be configured, and thus enhance the efficiency of performing configuration of the user equipment based on the subband to be configured. Therefore, the user equipment can quickly use the subband to be configured.

In another non-limiting embodiment, indicating configuration information of the subband to be configured to a user equipment may include: instructing the user equipment to decode a high-layer signaling over the common control channel to obtain the configuration information of the subband to be configured. In this case, the user equipment obtains the configuration information of the subband to be configured indirectly through the common control channel of the basic subband, that is, semi-statically obtains the configuration information of the subband to be configured.

The higher-layer signaling may be, for example, a signaling that is the same or similar to layer 3, such as Radio Resource Control (RRC) signaling. Obtaining the configuration information of the subband to be configured by the high-layer signaling, the user equipment only needs to receive the instruction of decoding the high-layer signaling, and after decoding the high-layer signaling, the user equipment obtains the configuration information of the subband to be configured through a data channel, which does not occupy resource of the common control channel; since the instruction of decoding the high-layer signaling occupies less resource of the common control channel, the user equipment can obtain relatively complete configuration information of the subband to be configured under the premise of saving the resource of the common control channel; in addition, during instructing the user equipment to decode the high-layer signaling to obtain the configuration information, the network side may receive feedback from the user equipment, which can enhance the reliability of instructing the user equipment to perform configuration.

It can be seen from the above that, there are both advantages and disadvantages for the user equipment obtaining the configuration information of the subband to be configured in a direct or indirect manner. The manner in which the user equipment obtains the configuration information can be selected according to a size of the configuration information of the subband to be configured and a timeliness requirement of the user equipment acquiring the configuration information of the subband to be configured.

In some embodiments, the configuration information of the subband to be configured includes one or more of: carrier configuration information of the subband to be configured, signal waveform configuration information of the subband to be configured, configuration information of a user-specified control channel wherein the user-specified control channel is a control channel assigned to the user equipment by a network side.

Wherein the carrier configuration information of the subband to be configured and the signal waveform configuration information of the subband to be configured are basic configurations of the subband to be configured; carrier configuration information may include subcarrier spacing and Cyclic Prefixes (CP) length; the waveform configuration may be a multi-carrier/single-carrier waveform which is applied, for example, an Orthogonal Frequency Division Multiplexing (OFDM) waveform, a Discrete Fourier Transform spread Orthogonal Frequency Division Multiplexing (DFT-s-OFDM) waveforms or other variant waveforms.

The user-specified control channel may be a business-related channel allocated by the network side, and different user equipments may correspond to different user-specified control channels.

The network side can transmit configuration information of common configuration of the user-specified control channel through the control channel, and the user equipment performs blind detection to the user-specified control channel after being set according to the common configuration information. Whether the control information in the user-specified control channel can be successfully read can be determined by the ID of the user equipment and the authority setting of each user equipment ID by the network side.

In addition, the user specifies that the control channel is independently encoded and modulated within one subband.

As such, a user-specified control channel can be flexibly set to accommodate different requirements and different scenarios.

In an embodiment of the present disclosure, the configuration information of the user-specified control channel may include one or more of: time-frequency resource location configuration information of the user-specified control channel, reference signal configuration information of the user-specified control channel. The reference signal configuration information of the user-specified control channel may refer to a time-frequency resource position occupied by the reference signal and a corresponding complex value (a plurality of complex values constitute a sequence).

In some embodiments, the aforementioned different configuration information corresponding to different subbands may be different from each other to achieve greater flexibility. After obtaining the aforementioned configuration information through the instruction of the common control channel, the user equipment can use each subband with flexible configuration, therefore utilization of time-frequency resources can be more flexible, and the utilization efficiency of the radio resources can be improved.

For example, different subbands can be configured with different carrier configurations: subcarrier spacing and cyclic prefix length, etc.; application scenarios for different subbands may be different, such as small subcarrier spacing and long cyclic prefixes corresponding to large coverage and delay-insensitive services, while large subcarrier spacing and short cyclic prefixes corresponding to small coverage and delay-sensitive services.

In some embodiments, a time-frequency position of the user-specified control channel does not coincide with a time-frequency position of the common control channel, and can be located in the basic subband where the common control channel is located or in a subband other than the basic subband where the common control channel is located; the user-specified control channel does not coincide with the dedicated resource unit either, to ensure that the dedicated resource unit smoothly can transmit the broadcast type signal and channel, which facilitates the user equipment to receive the broadcast type signal and channel and access the basic subband.

Figure 2:
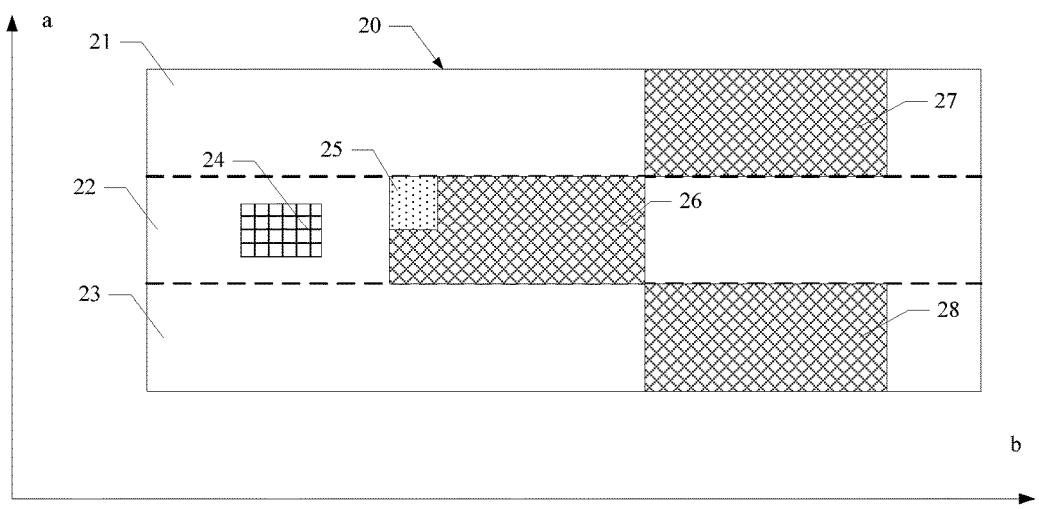
FIG. 2 schematically illustrates a resource allocation diagram according to an embodiment of the present disclosure.

With reference to FIG. 2, a time-frequency position of the user-specified control channel is illustrated as follows: a-direction in FIG. 2 indicates a time domain and b-direction indicates a frequency domain; a bandwidth resource 20 indicates available bandwidth resource within a certain time domain, wherein the bandwidth resource 20 can be divided into a plurality of subbands, three subbands of the plurality of subbands are shown in FIG. 2: a subband 21, a subband 22 and a subband 23. It can be understood that, although only three subbands are shown in the figure, the actual number of the subbands is not limited hereto.

A common control channel 24 is located in a subband of the bandwidth resource 20, for example a subband 22. The common control channel 24 is located in a dedicated resource unit (not shown in the figure), wherein the dedicated resource unit may be located within a frequency domain of a subband, and have a same frequency domain as a subband or less than a bandwidth of a subband. Although only one of the common control channel is shown in the figure, the common control channel may appear at a plurality of locations in the frequency domain and in the time domain.

A user-specified control channel 25 is located in the subband 22. It is understood that the user-specified control channel 25 may also be located at a location of unallocated dedicated resource unit in any subband, the user-specified control channel 25 may have a bandwidth less than or equal to the bandwidth of the any subband, and a position of the user-specified control channel 25 can be determined according to actual needs.

In some embodiments, the user equipment may detect control information on a user-specified control channel according to configuration information of the user-specified control channel. As previously described, the user-specified control channel is a service-related control channel. The configuration information of the user-specified control channel can be broadcasted to the user equipment by a network side, and the user equipment may perform the detection based on the configuration information of the user-specified control channel to acquire the control information on the user-specified control channel.

Referring to FIG. 1, in some embodiments, after the user equipment receives the configuration information of the user-specified control channel, the network side may instruct the user equipment to transmit and receive data through the control information on the user-specified control channel in step S12.

In an embodiment of the present disclosure, the network side instructs the user equipment to transmit and receive data via control information on the user-specified control channel, and the data is transmitted and received via a subband where the user-specified control channel is located. A resource allocation diagram may be referred to FIG. 2.

In FIG. 2, a resource area 26 is applied to data transmission and reception, and may be located in a same subband as the user-specified control channel 25 and behind the user-specified control channel 25 in the time domain. Then, the data is transmitted and received simply and quickly without going through any complex scheduling process.

In an embodiment of the present disclosure, a network side instructs a user equipment to transmit and receive data through control information on a user-specified control channel, and the data is transmitted and received via a subband other than a location subband where the user-specified control channel is located.

For example, in FIG. 2, the user-specified control channel 25 is located in the subband 22, and a time-frequency position of the data transmission and reception can be located at a position of a resource area 27, or a time-frequency position of a resource area 28. Then, a plurality of subbands can be used more rationally. In particular, when a certain subband have not sufficient time domain resources, the data can be transmitted and received in time through other idle subbands, so that the control method according to the embodiments of the present disclosure has a higher flexibility.

In some embodiments, the configuration information may include repeating instruction information for instructing the user equipment to perform configuration periodically in accordance with the configuration information. For example, the repeating instruction information may instruct the user equipment to perform configuration repeatedly at a predefined time period within a certain period of time. The time period may be a subframe or a transmission time interval and may be different for different subbands.

In each of the aforementioned embodiments, the network side indicating the configuration information of the subband to be configured to the user equipment through the basic subband includes, the network side directly broadcasts the indication to the user equipment through the basic subband.

In some embodiments, the network side indicates the configuration information of the subband to be configured to the user equipment through the basic subband. Alternatively, the network side may broadcast the configuration information of the subband to be configured to the user equipment through the basic subband. In this case, the user equipment can use the subband to be configured according to the configuration information of the subband to be configured, and can receive unicast information of the network side through the subband to be configured; the network side then indicates the configuration information of a unicast configured subband to the user equipment in a unicast mode, so as to enable the user equipment to use the unicast configured subband which is a subband other than the subband to be configured. As can be seen from above, the configuration information of the subband to be configured may be transmitted to the user equipment by the network side in a broadcast and unicast manner.

The above process will be described in detail with reference to FIG. 1, the control method of the user equipment according to the embodiment of the present disclosure may further include a step S13: indicating configuration information of a unicast configured subband to a user equipment in a unicast mode via the subband to be configured.

In this manner, the network side informs the user equipment of the configuration information of the subband to be configured only by broadcasting, and the network side informs the user equipment of configuration information of other subbands on the subband to be configured by unicast, which can increase configuration flexibility and reduce complexity of user equipment. If only the broadcast mode is used, the user equipments informed in a broadcast are assigned with a same subband; if both broadcast and unicast are used, the network side may assign different subbands to different user equipments according to situation. Thus, the user equipment can perform a targeted detection, namely detect only a user-specified control channel of a allocated subband, thereby reducing the complexity of the user equipment detecting channels.

The embodiments of the present disclosure indicates the configuration information of the subband to be configured to the user equipment through the common control channel of the basic subband, so that the user equipment can perform configuration based on the subband to be configured according to the indication of the common control channel. Then the user equipment can detect scheduling information, and be scheduled for data transmission and reception, so as to use any subband within the system bandwidth. By the above process, the user equipment can use different subbands with different configuration, thus the subbands within the system bandwidth can be configured flexibly. In addition, service process can be carried out in the subbands with flexible configuration in order to meet the requirements of different application scenarios.

Figure 3:
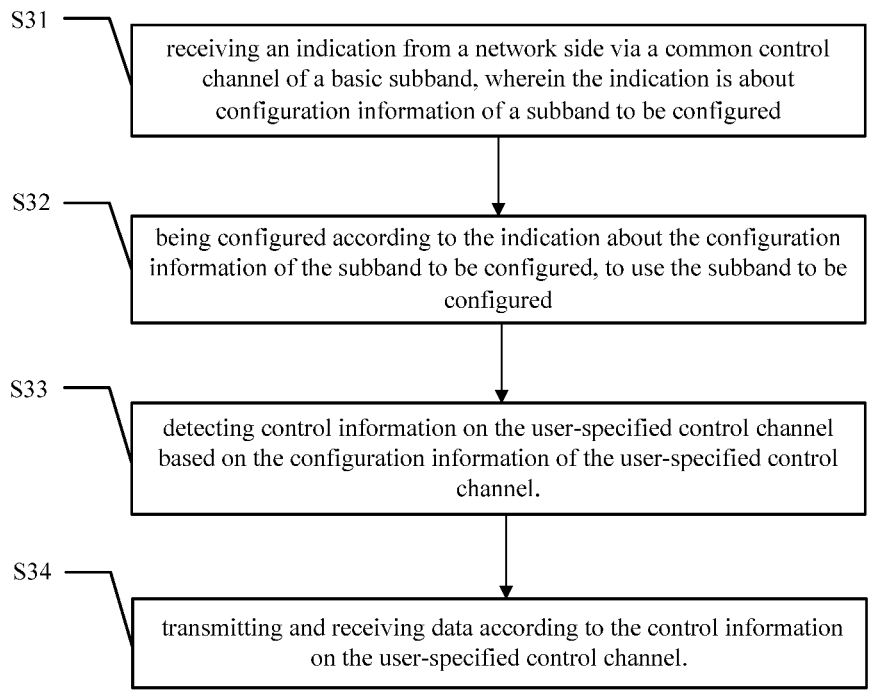
FIG. 3 schematically illustrates a flow chart of a control method of a user equipment according to another embodiment of the present disclosure.

A control method of a user equipment is provided according to another embodiment of the present disclosure. A flow chart of the control method is shown in FIG. 3. The control method of the user equipment shown in FIG. 3 may be applied to a user equipment side.

In step S31, an indication from the network side is received via a common control channel of a basic subband, wherein the indication is about the configuration information of a subband to be configured.

In step S32, the subband to be configured is used according to the indication about the configuration information of the subband to be configured.

Wherein the basic subband is a subband to which the user equipment has access, and the subband to be configured includes any subband within a bandwidth resource.

Figure 4:
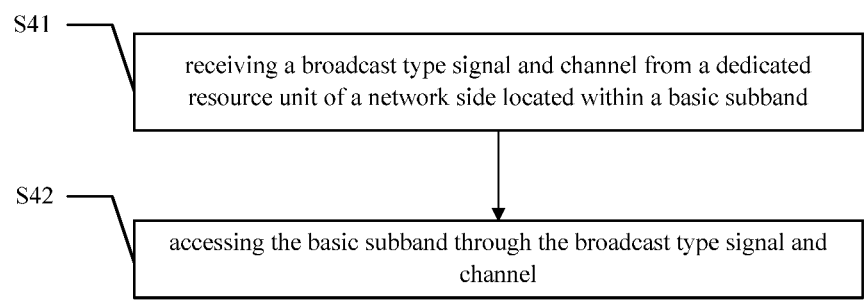
FIG. 4 schematically illustrates a flow chart of an access method of a basic subband according to an embodiment of the present disclosure.

In some embodiments, prior to the step S31, the user may access the basic subband with a method as shown in FIG. 4:

in step S41, receiving a broadcast type signal and channel from a dedicated resource unit of a network side located within a subband; and in step S42, accessing the basic subband by using the broadcast type signal and channel.

Wherein the dedicated resource unit is only applied to transmit the broadcast type signal and channel, and the dedicated resource unit is continuous in a frequency domain and a time domain.

In some embodiments, the network side may directly transmit the configuration information of the subband to be configured via the common control channel, that is, the configuration information is directly included in the indication about the configuration information of the subband to be configured.

Wherein the configuration information is directly included in the indication about the configuration information of the subband to be configured, that is, the network side transmits the configuration information of the subband to be configured directly through the common control channel. The common control channel is a bottom layer of 5G system and also a physical channel. It is possible to efficiently instruct the user equipment to perform configuration based on the subband to be configured by transmitting the configuration information directly through the bottom layer, and thus the configuration efficiency of the user equipment based on the subband to be configured is improved, and also the user equipment can quickly use the subband to be configured.

In another embodiment, the indication about the configuration information of the subband to be configured may be an indirect indication for instructing the user equipment to decode scheduling information of a high-layer signaling to obtain the configuration information of the subband to be configured.

When the indication about the configuration information of the subband to be configured is an indirect indication, the network side instructs the user equipment to decode the high-layer signaling through the common control channel, and the user equipment decodes the high-layer signaling after receiving the instruction from the network side, to obtain the configuration information of the subband to be configured; obtaining the configuration information of the subband to be configured through the high-layer signaling, the user equipment only needs to receive the instruction of decoding the high-layer signaling, and after decoding the high-layer signaling, the user equipment obtains the configuration information of the subband to be configured through a data channel, which does not occupy resources of the common control channel; since the common control channel resources occupied by instruction of decoding the high-layer signaling is less, the user equipment can obtain relatively complete configuration information of the subband to be configured under premise of saving the resources of the common control channel; In addition, during instructing the user equipment to decode the high-layer signaling to obtain the configuration information, the network side can receive a feedback from the user equipment, so that the reliability of instructing the configuration of the user equipment can be improved.

In some embodiments, the configuration information of the subband to be configured may include at least one of: carrier configuration information of the subband to be configured, signal waveform configuration information of the subband to be configured, and configuration information of a user-specified control channel, wherein the user-specified control channel is a control channel assigned by the network side to the user equipment.

In some embodiments, the configuration information of the user-specified control channel includes at least one of: time-frequency resource location configuration information of the user-specified control channel, and reference signal configuration information of the user-specified control channel.

Referring to FIG. 3, in some embodiments, the configuration information of the subband to be configured includes configuration information of a user-specified control channel, and the control method of the user equipment may further include:

In step S33, detecting control information on a user-specified control channel based on configuration information of the user-specified control channel.

In some embodiments, the control method of the user equipment as shown in FIG. 3 may further include:

In step S34, transmitting and receiving data according to the control information on the user-specified control channel.

According to an embodiment of the present disclosure, the data transmission and reception in the step S34 may be performed via a subband in which the user-specified control channel is located.

According to another embodiment of the present disclosure, the data transmission and reception in the step S34 may be performed via a subband other than a location subband in which the user-specified control channel is located.

In some embodiments, the configuration information includes repeating instruction information for instructing the user equipment to perform configuration periodically in accordance with the configuration information.

In some embodiments, the common control channel may be repeated in a time domain and a frequency domain of the basic subband, and upon access to the basic subband, the user equipment may determine whether to detect the repeated common control channel as needed.

In some embodiments, after performing configuration according to the indication about the configuration information of the subband to be configured, the control method may further include receiving a unicast instruction about a unicast configured subband from the network side through the subband to be configured, wherein the unicast subband is a subband other than the subband to be configured.

The control method of the user equipment shown in FIG. 3 corresponds to the control method of the user equipment shown in FIG. 1, and the specific implementation of the control method of the user equipment shown in FIG. 3 can be referred to that of the control method of the user equipment shown in FIG. 1, which will not be described again herein.

In the embodiments of the present disclosure, the configuration information of the subband to be configured is indicated to the user equipment by the common control channel of the basic subband, so that the user can perform configuration based on the subband to be configured according to the indication of the common control channel, to use other subbands. By the above process, the user equipment can use subbands with different configuration, and thus a flexible configuration is achieved so as to meet the requirements of different scenarios.

Figure 5:
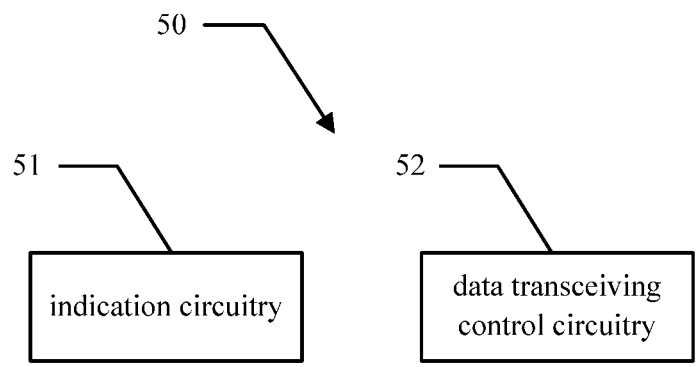
FIG. 5 schematically illustrates a structural diagram of a network side device according to an embodiment of the present disclosure.

A network side device is also provided according to an embodiment of the present disclosure, and a structure diagram of the network side is schematically illustrated in FIG. 5.

The network side device 50 may include an indication circuitry 51, configured to indicate configuration information of a subband to be configured to a user equipment through a common control channel of a basic subband, so that the user equipment can use the subband to be configured according to the configuration information, wherein the basic subband is a subband to which the user equipment has accessed, and the subband to be configured includes any subband within a bandwidth resource.

In some embodiments, the indication circuitry 51 may transmit the configuration information of the subband to be configured directly through the common control channel.

In some embodiments, the indication circuitry 51 may also instruct the user equipment to decode a high-layer signaling over the common control channel to obtain the configuration information of the subband to be configured.

In some embodiments, the configuration information of the subband to be configured may include one or more of: carrier configuration information of the subband to be configured, signal waveform configuration information of the subband to be configured, and configuration information of a user-specified control channel, wherein the user-specified control channel is a control channel assigned by the network side to the user equipment.

In some embodiments, the configuration information of the user-specified control channel may include at least one of: time-frequency resource location configuration information of the user-specified control channel and reference signal configuration information of the user-specified control channel.

In some embodiments, the configuration information of the subband to be configured includes configuration information of a user-specified control channel, and the user equipment detects control information on the user-specified control channel according to the configuration information of the user-specified control channel.

According to an embodiment of the present disclosure, the configuration information of the subband to be configured includes configuration information of a user-specified control channel, and the user equipment detects control information on the user-specified control channel according to the configuration information of the user-specified control channel. The network side device 50 further includes a data transceiving control circuitry 52, configured to instruct the user equipment to transmit and receive data through the control information on the user-specified control channel.

In a non-limiting embodiment, the data transceiving control circuitry 52 is configured to instruct the user equipment to transmit and receive data through control information on the user-specified control channel, and the data is transmitted and received via a subband where the user-specified control channel is located.

In another non-limiting embodiment, the data transceiving control circuitry 52 is configured to instruct the user equipment to transmit and receive data through control information on the user-specified control channel, and the data is transmitted and received via a subband other than a location subband where the user-specified control channel is located.

In some embodiments, the configuration information transmitted by the common control channel may include repeating instruction information for instructing the user equipment to perform configuration periodically in accordance with the configuration information.

In some embodiments, the user equipment may access the basic subband by way of receiving a broadcast type signal and channel from a dedicated resource unit of the network side located within the basic subband to access the basic subband; wherein the dedicated resource unit is only applied to transmit the broadcast type signal and channel, and the dedicated resource unit is continuous in a frequency domain and a time domain.

In some embodiments, the network side device 50 may further include a unicast instructing unit configured to instruct configuration information of a unicast configured subband to a user equipment through a subband to be configured in a unicast manner, wherein the unicast configured subband is a subband other than the subband to be configured.

The control method of the user equipment shown in FIG. 5 corresponds to the control method of the user equipment shown in FIG. 1. The specific implementation and advantageous of the user equipment shown in FIG. 5 can be referred to the control method of the user equipment shown in FIG. 1, which will not be discussed herein.

Figure 6:
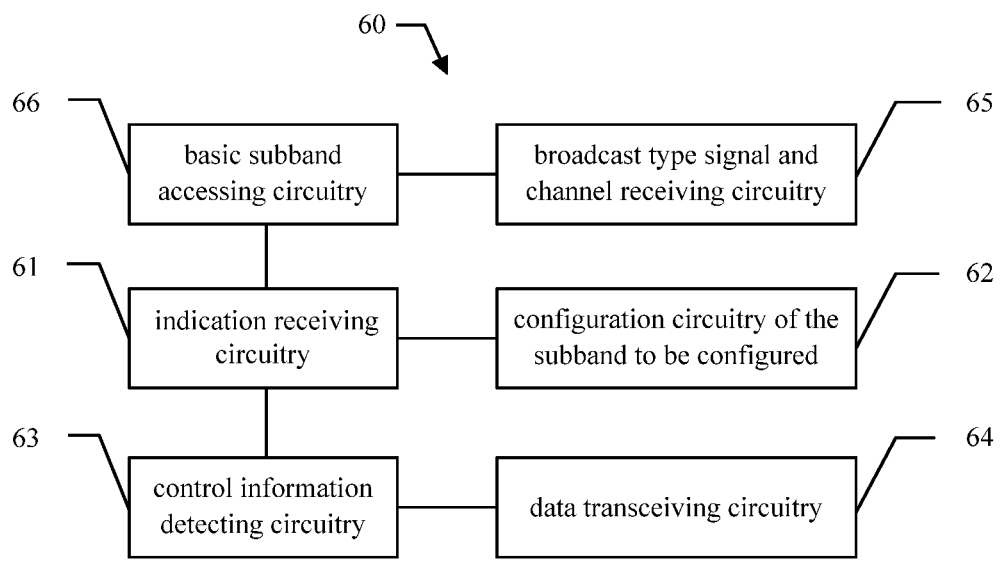
FIG. 6 schematically illustrates a structural diagram of a user equipment according to an embodiment of the present disclosure.

A user equipment is also provided according to an embodiment of the present disclosure, and a structure diagram of the user equipment is schematically illustrated in FIG. 6.

A user equipment 60 may include:

An indication receiving circuitry 61, configured to receive an indication from a network side through a common control channel of a basic subband, wherein the indication is about configuration information of a subband to be configured.

A configuration circuitry 62 for the subband to be configured, configured to perform configuration according to the indication about the configuration information of the subband to be configured, in order to use the subband to be configured.

Wherein the basic subband is a subband to which the user equipment has access, and the subband to be configured includes any subband within a bandwidth resource.

In some embodiments, the configuration circuitry 62 may perform configuration to internal parameters of the user equipment 60.

In some embodiments, the indication about the configuration information of the subband to be configured may directly include the configuration information of the subband to be configured.

In some embodiments, the indication about the configuration information of the subband to be configured may include scheduling information for instructing the user equipment to decode a high-layer signaling; and the user equipment further includes a high-layer signaling decoding circuitry configured to decode the high-layer signaling according to the scheduling information so as to obtain the configuration information of the subband to be configured.

In some embodiments, the configuration information of the subband to be configured includes at least one of: carrier configuration information of the subband to be configured, signal waveform configuration information of the subband to be configured, and configuration information of a user-specified control channel, wherein the user-specified control channel is a control channel assigned by a network side to a user equipment.

In some embodiments, the configuration information of the user-specified control channel includes at least one of: time-frequency resource location configuration information of the user-specified control channel and reference signal configuration information of the user-specified control channel.

In some embodiments, the configuration information of the subband to be configured includes configuration information of a user-specified control channel, and the user equipment 60 may further include a control information detecting circuitry 63 configured to detect control information on the user-specified control channel based on the configuration information of the user-specified control channel.

In some embodiments, the configuration information of the subband to be configured includes configuration information of a user-specified control channel, the user equipment 60 includes a control information detecting circuitry 63 configured to detect control information on the user-specified control channel based on the configuration information of the user-specified control channel. In addition, the user equipment 60 may further include a data transceiving circuitry 64 configured to transmit and receive data according to the control information on the user-specified control channel.

In an embodiment of the present disclosure, the data transceiving circuitry 64 is configured to transmit and receive the data via a subband in which the user-specified control channel is located.

In another embodiment of the present disclosure, the data transceiving circuitry is configured to transmit and receive the data via a subband other than a location subband where the user-specified control channel is located.

In some embodiments, the configuration information includes repeating instruction information for instructing the user equipment to perform configuration periodically in accordance with the configuration information.

In some embodiments, the user equipment 60 may further include:

a broadcast type signal and channel receiving circuitry 65, configured to receive a broadcast type signal and channel from a dedicated resource unit of network side located within a basic subband; and a basic subband accessing circuitry 66, configured to access the basic subband by using the broadcast type signal and channel;

Wherein the dedicated resource unit is applied only to transmit the broadcast type signal and channel, and the dedicated resource unit is continuous in a frequency domain and a time domain.

In some embodiments, the network side device 60 may further include a unicast indication receiving circuitry (not shown in the figure) configured to receive a unicast indication about a unicast configured subband from a network side through the subband to be configured, wherein the unicast configured subband is a subband other than the subband to be configured.

The control method of the user equipment shown in FIG. 6 corresponds to the control method of the user equipment shown in FIG. 3, and the specific implementation and advantages of the user equipment shown in FIG. 6 can be referred to that of the control method of the user equipment shown in FIG. 3, which will not be discussed herein.

It will be appreciated by those of ordinary skill in the art that all or a portion of the steps in the various methods of the embodiments described above may be performed by a program that instructs the associated hardware to be stored in a computer-readable storage medium which may include: ROM, RAM, magnetic disk, or optical disk etc.

Although the present invention has been described above, the present invention is not limited thereto. It should be understood by those skilled in the art that various changes and modifications may be made without departing from the spirit and scope of the invention, and it is therefore intended that the scope of protection of the invention be defined by the claims.

What is claimed is:

1. A control method of a user equipment, comprising: indicating configuration information of a subband to be configured to the user equipment via a common control channel of a basic subband, such that the user equipment can use the subband to be configured according to the configuration information, wherein the basic subband is a subband to which the user equipment has access, and the subband to be configured comprises any subband within a bandwidth resource;
    wherein the control method further comprises indicating configuration information of a unicast configured subband to the user equipment in a unicast mode via the subband to be configured, after indicating the configuration information of the subband to be configured to the user equipment via the common control channel of the basic subband.

2. The control method of the user equipment according to claim 1, wherein indicating the configuration information of the subband to be configured to the user equipment comprises: transmitting the configuration information of the subband to be configured directly through the common control channel.

3. The control method of the user equipment according to claim 2, wherein the configuration information of the subband to be configured comprises at least one of: carrier configuration information of the subband to be configured, signal waveform configuration information of the subband to be configured and configuration information of a user-specified control channel, wherein the user-specified control channel is a control channel assigned to the user equipment by a network side.

4. The control method of the user equipment according to claim 3, wherein the configuration information of the user-specified control channel comprises at least one of: time-frequency resource location configuration information of the user-specified control channel and reference signal configuration information of the user-specified control channel.

5. The control method of the user equipment according to claim 1, wherein indicating the configuration information of the subband to be configured to the user equipment comprises: instructing the user equipment to decode a high-layer signaling via the common control channel to obtain the configuration information of the subband to be configured.

6. The control method of the user equipment according to claim 5, wherein the configuration information of the subband to be configured comprises at least one of: carrier configuration information of the subband to be configured, signal waveform configuration information of the subband to be configured and configuration information of a user-specified control channel, wherein the user-specified control channel is a control channel assigned to the user equipment by a network side.

7. The control method of the user equipment according to claim 6, wherein the configuration information of the user-specified control channel comprises at least one of: time-frequency resource location configuration information of the user-specified control channel and reference signal configuration information of the user-specified control channel.

8. The control method of the user equipment according to claim 1, wherein the configuration information of the subband to be configured comprises configuration information of a user-specified control channel, and the user equipment detects control information on the user-specified control channel based on the configuration information of the user-specified control channel.

9. The control method of the user equipment according to claim 8, further comprising: instructing the user equipment to transmit and receive data through the control information on the user-specified control channel.

10. The control method of the user equipment according to claim 9, wherein the data is transmitted and received via a subband where the user-specified control channel is located.

11. The control method of the user equipment according to claim 9, wherein the data is transmitted and received via a subband other than a location subband where the user-specified control channel is located.

12. The control method of the user equipment according to claim 1, wherein the configuration information comprises repeating instruction information for instructing the user equipment to perform configuration periodically in accordance with the configuration information.

13. The control method of the user equipment according to claim 1, wherein the user equipment accessing the basic subband comprises: receiving, by the user equipment, a broadcast type signal and channel from a dedicated resource unit of a network side located within the basic subband for accessing the basic subband; wherein, the dedicated resource unit is only applied to transmit the broadcast type signal and channel, and the dedicated resource unit is continuous in a frequency domain and a time domain.

14. The control method of the user equipment according to claim 1, wherein indicating configuration information of a subband to be configured to the user equipment via a common control channel of a basic subband, such that the user equipment can use the subband to be configured according to the configuration information comprises:
    indicating configuration information of a subband to be configured to the user equipment via a common control channel of a basic subband, such that the user equipment can be configured to detect control information and to be controlled to transmit and receive data for traffic processing according to the indication.

15. A control method of a user equipment, comprising:
    receiving an indication from a network side via a common control channel of a basic subband, wherein the indication is about configuration information of a subband to be configured; and
    performing configuration according to the indication about the configuration information of the subband to be configured, to use the subband to be configured;
    wherein the basic subband is a subband to which the user equipment has access, and the subband to be configured comprises any subband within a bandwidth resource;
    wherein the control method further comprises receiving a unicast indication about a unicast configured subband from the network side via the subband to be configured after performing configuration according to the indication about the configuration information of the subband to be configured.

16. The control method of the user equipment according to claim 15, wherein the indication about the configuration information of the subband to be configured directly comprises the configuration information of the subband to be configured.

17. The control method of the user equipment according to claim 16, wherein the configuration information of the subband to be configured comprises at least one of: carrier configuration information of the subband to be configured, signal waveform configuration information of the subband to be configured and configuration information of a user-specified control channel, wherein the user-specified control channel is a control channel assigned to the user equipment by the network side.

18. The control method of the user equipment according to claim 17, wherein the configuration information of the user-specified control channel comprises at least one of: time-frequency resource location configuration information of the user-specified control channel and reference signal configuration information of the user-specified control channel.

19. The control method of the user equipment according to claim 15, wherein the indication about the configuration information of the subband to be configured comprises: scheduling information instructing the user equipment to decode a high-layer signaling; and the user equipment decodes the high-layer signaling according to the scheduling information to obtain the configuration information of the subband to be configured.

20. The control method of the user equipment according to claim 19, wherein the configuration information of the subband to be configured comprises at least one of: carrier configuration information of the subband to be configured, signal waveform configuration information of the subband to be configured and configuration information of a user-specified control channel, wherein the user-specified control channel is a control channel assigned to the user equipment by the network side.

21. The control method of the user equipment according to claim 20, wherein the configuration information of the user-specified control channel comprises at least one of: time-frequency resource location configuration information of the user-specified control channel and reference signal configuration information of the user-specified control channel.

22. The control method of the user equipment according to claim 15, wherein the configuration information of the subband to be configured comprises configuration information of a user-specified control channel, and the control method further comprises: detecting control information on the user-specified control channel based on the configuration information of the user-specified control channel.

23. The control method of the user equipment according to claim 22, further comprising: transmitting and receiving data according to the control information on the user-specified control channel.

24. The control method of the user equipment according to claim 23, wherein the data is transmitted and received via a subband where the user-specified control channel is located.

25. The control method of the user equipment according to claim 23, wherein the data is transmitted and received via a subband other than a location subband where the user-specified control channel is located.

26. The control method of the user equipment according to claim 15, wherein the configuration information comprises repeating instruction information for instructing the user equipment to perform configuration periodically in accordance with the configuration information.

27. The control method of the user equipment according to claim 15, further comprising:

receiving a broadcast type signal and channel from a dedicated resource unit of the network side located within the basic subband; and accessing the basic subband through the broadcast type signal and channel;

wherein the dedicated resource unit is only applied to transmit the broadcast type signal and channel, and the dedicated resource unit is continuous in a frequency domain and a time domain.

28. The control method of the user equipment according to claim 15, wherein performing configuration according to the indication about the configuration information of the subband to be configured to use the subband to be configured comprises:

performing configuration to the user equipment according to the indication so that the user equipment can detect control information and be controlled to transmit and receive data for traffic processing.

* * * * *